United States Patent

Valfre

[15] 3,684,975

[45] Aug. 15, 1972

[54] NEGATIVE IMPEDANCE AMPLIFIER

[72] Inventor: Cesare Valfre, via Borgosesia 46 bis, Torino, Italy

[22] Filed: July 10, 1970

[21] Appl. No.: 53,801

[52] U.S. Cl. ....................330/207 P, 330/24, 330/35, 330/189, 330/196

[51] Int. Cl..............................H03f 21/00, H03f 3/16

[58] Field of Search.....................330/53, 61 A, 207 P

[56] References Cited

UNITED STATES PATENTS

| | | | |
|---|---|---|---|
| 3,551,838 | 12/1970 | Valfre | 330/61 A |
| 2,284,555 | 5/1942 | Black | 330/53 X |
| 2,209,955 | 8/1940 | Black | 330/53 X |
| 1,687,253 | 10/1928 | Latour | 330/61 A |

FOREIGN PATENTS OR APPLICATIONS

| | | | |
|---|---|---|---|
| 366,309 | 2/1963 | Switzerland | 330/61 A |

*Primary Examiner*—Nathan Kaufman
*Attorney*—Clario Ceccon

[57] ABSTRACT

A negative impedance amplifier for a transmission line having two transformers and an amplifier. The size of the transformers is reduced and the resulting losses are compensated by increasing the gain of the amplifier. A negative feedback loop also reduces losses. A capacitor circuit is placed on the line connections to permit remote feeding. The transformers can be connected to the amplifier to provide for either series type or parallel type connection to the line.

4 Claims, 10 Drawing Figures

NEGATIVE IMPEDANCE AMPLIFIER

The present invention relates to a negative impedance amplifier.

It is known that a group of two amplifiers (one for each direction of propagation) and two differential transformers have been first used for compensating attenuation in two wire telephone lines. More recently negative impedance amplifiers have been used.

These are devices which when inserted in a telephone line, employ the power taken from a suitable source to raise the transmission level.

Practically a suitably realized negative impedance amplifier, of the "series type," can be connected in series on a wire of the line and preferably on both the wires. A differently realized negative impedance amplifier of the "parallel type" can be connected in parallel between the wires of the line. Each the embodiments have some advantages but the best embodiment consists in connecting at the same time a series amplifier and a parallel amplifier on the same line.

According to a known embodiment the series amplifier comprises two transformers, in which the primary winding of one transformer is connected in series to the secondary winding of the other one, in such a direction that the output voltage from this last winding is in phase opposition with the voltage of the primary winding of the first transformer, the group being connected in series on the line. The secondary winding of the first amplifier is connected to the bases of two transistors and to an equalization network. The primary winding of the second transformer is connected to the emitters of the two transistors.

Similarly a known negative impedance amplifier of the parallel type comprises two transformers in which the primary winding of the first one is connected in parallel with the secondary winding of the second one, in such a direction that the output current from this last transformer is in phase opposition with the input current in the primary winding of the first transformer, the group of two transformers being connected in parallel with the line. A pair of transistors in push-pull relationship are connected between the secondary winding of the first transformer and the primary winding of the second transformer the emitter and the collector being respectively the input and the output.

These known arrangements have generally a satisfactory operation, but are relatively cumbersome. This disadvantage has become much greater since in the modern exchanges the number of wires on which the amplifiers are to be connected is very great sometimes being more than 2,000 wires in each exchange.

It is an object of the invention to provide an amplifier of the series type and an amplifier of the parallel type and a group resulting from combining the two types, which have a greatly reduced size without loss in performance under the same performances.

It is to be remembered that, to face the urgent need of reducing the size of the amplifier, it is impossible to keep the same design and merely change in scale the various dimensions. This is because, as is known a telephone repeater must have an optimum impedance, adapted to the impedance of the line. Consequently, if the section of the iron core of the transformer is reduced,the number of turns must increased to keep constant the impedance of their winding. In this way the resistance of copper will be greatly increased, resulting in great losses and in degrading operating conditions.

According to the invention an amplifier group (or repeater) is realized by means of transformers of a very small size,and the aforesaid losses are compensated by an amplifier of suitable gain.

To avoid the amplifier requiring a great size because of the greater performance required, according to the invention it is proposed to use an integrated linear amplifier. This allows also a reduction in the ratio of transformation of the first transformer, since it is possible to compensate the lower input voltage of the amplifier by a greater gain; in practice, if in the known embodiments there was a 10 : 1 ratio, now a 1 : 1 ratio is sufficient.For the second transformer the inductance of the two windings is reduced,and the greater magnetizing current absorbed by the inductance is prevented from causing an overdrop of the output voltage,by using a negative voltage feedback.

As is known,an equalization line is usually employed in telephone lines,whose object is to change conveniently the overall attenuation as a function of the frequency. A high ratio of negative feedback is used both in the conventional negative impedance repeaters, and in the repeaters according to the invention,to stabilize the operation of the repeater. According to the invention,the equalization network is preferably connected in the negative feedback loop,which has a high impedance,so that this network can be realized by components of reduced size,and particularly for reduction in the size of capacitors.

Further objects,characteristics and advantages of the invention will become more apparent from the following description of the invention with reference to the accompanying drawings in which.

Figure 1:
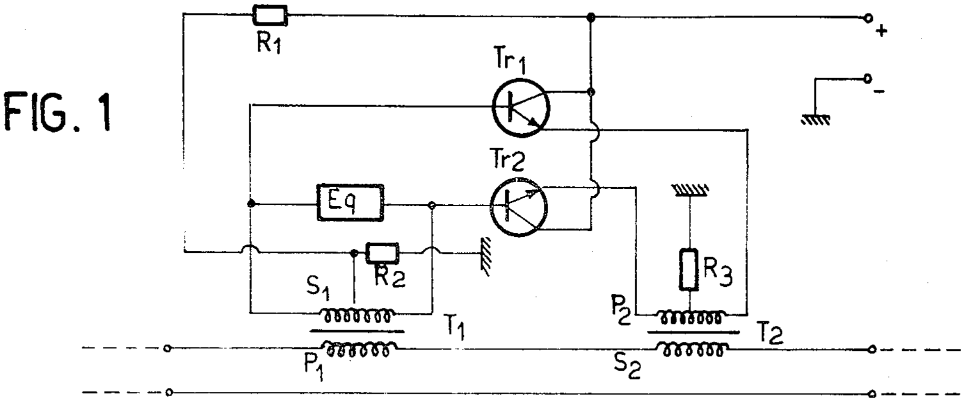
FIG. 1 shows a series amplifier,of known construction.

In the drawings (FIG. 1) the primary winding $P_1$ of a transformer $I_1$ is connected in series with the secondary winding $S_2$ of another transformer $T_2$,and the group is connected in series on the telephone line shown by dashed lines.

The secondary winding $S_1$ of the transformer $T_j$ is connected to the bases of two transistors $Tr_1$ and $Tr_2$ and to the equalization network Eq.

The primary winding $P_2$ of the transformer $T_2$ is connected to the emitters of the two transistors,while the collectors are connected to each other and to a terminal of the supply. The polarization of the bases of the transistors is carried out by connecting the center of the winding $S_1$ to a choker formed by the resistors $R_1$ and $R_2$ connected between the supply and ground.

The polarization of the emitters of the transistors is obtained by the resistor $R_3$ connected between the center of $P_2$ and the ground.

Figure 2:
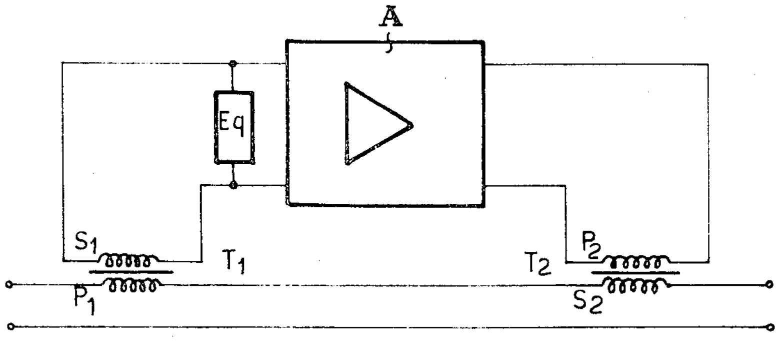
FIG. 2 shows a diagram of substantially known type,which can serve as a base for carrying out the modifications according to the invention.

Referring to FIG. 2, $P_1$ and $S_2$ are connected in series with each other and with the telephone line,while the secondary winding $S_1$ is connected to the input of an amplifier A and to the equalization network Eq. The primary winding $P_2$ is connected to the output from the amplifier A.

Figure 3:
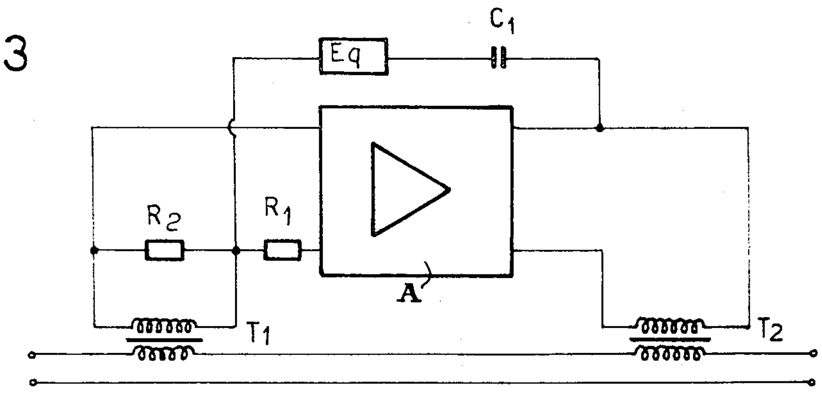
FIG. 3 shows a first preferred embodiment of a series amplifier according to the invention.

FIG. 3 is similar to FIG. 2, except that the equalization network Eq is connected in series with the negative feedback loop. As it is shown in the figure,a voltage is taken from the output from amplifier A which voltage is fed back to the input through a capacitor $C_1$ the equalization network Eq and the resistor $R_1$.

Figure 4:
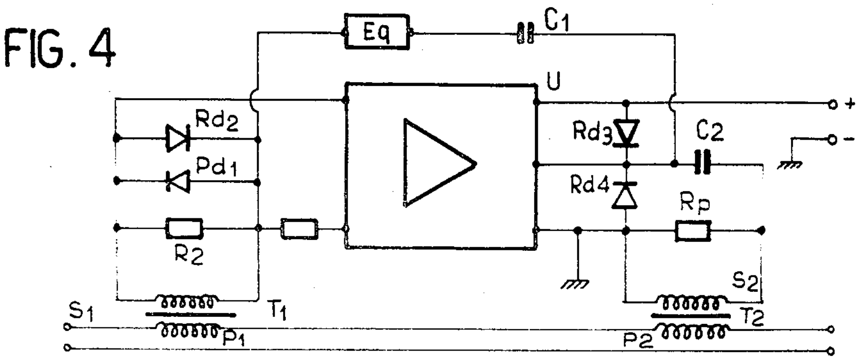
FIG. 4 is a more detailed diagram,showing the protections against overvoltages and overcurrents from the line.

FIG. 4 shows a modification of FIG. 3 in which a capacitor $C_2$ is connected in series with the secondary winding S2 of the transformer T2 and diodes Rd1, Rd2 have been connected opposite to each other and in parallel with the winding S1. Two diodes Rd3, Rd4 have been connected between the terminals of the output U, one towards an end of the supply and the other towards the other end. The cathodes of said diodes are connected to the output U.

The diagram shows also a resistor $R_p$ in parallel with the winding $S_2$ and whose function is to reduce the attenuation of the line when the amplifier is not fed.

Figure 5:
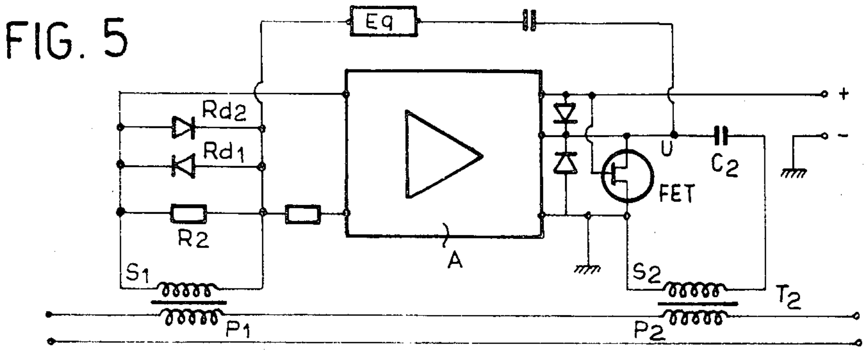
FIG. 5 is another diagram of a repeater according to the invention, with a field effect transistor.

Referring to FIG. 5 a field effect transistor FET is inserted in place of said resistor $R_p$. The base of said transistor being connected to the supply,while the collector is connected to the output point U of the amplifier, and the emitter is grounded.

Figure 6:
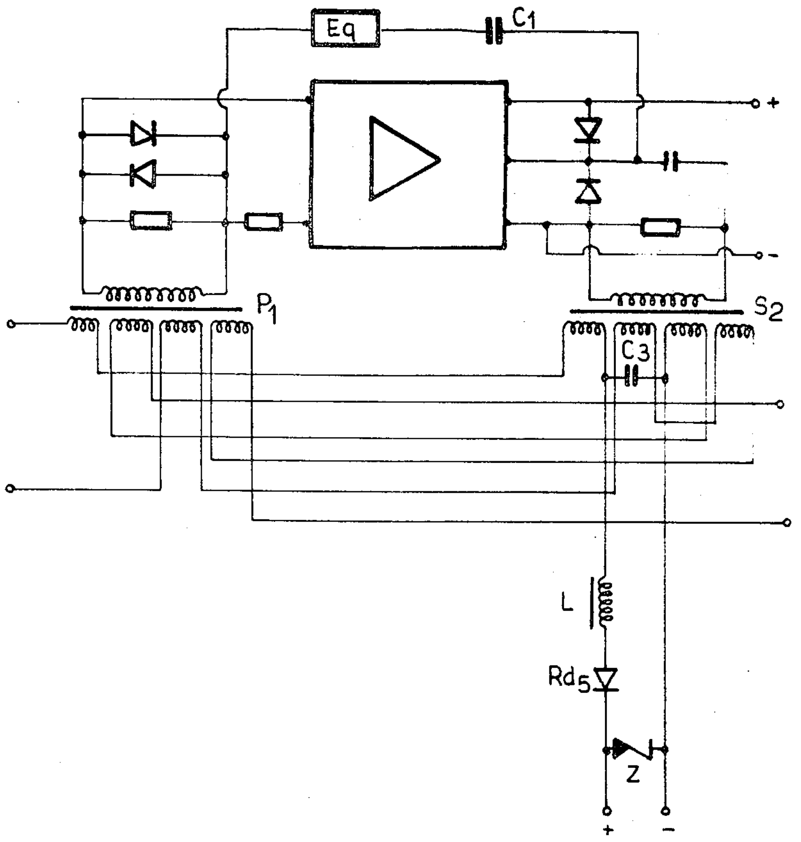
FIG. 6 shows how the windings of the transformers can be divided to have a more balanced connection on the line.

The arrangement of FIG. 6 is like the one shown in FIG. 4, except that the primary winding $P_1$ and the secondary winding $S_2$ are divided into four equal winding sections and are connected to the wires of the line in a symmetrical or balanced way.

In the same figure is shown a capacitor $C_3$ for remote supply. That is, the remote voltage required to supply these devices is taken at the ends of $C_3$. Said voltage passes an inductance L and a rectifier Rd5 in series and a Zener diode Z in parallel.

The operation of the devices shown in FIGS. 1, 2 and 3 is easily understood by those skilled in the art and it does not need to be explained.

In the embodiment of FIG. 4, the diodes Rd1, and Rd2 serve to protect the amplifier's input against the overvoltages in the line. They act as limiters,which limit the amplifier input voltage to the value of their output threshold voltage. The diodes Rd3 and Rd4, when going into conduction,prevent the voltage at the output terminal U from exceeding the feed voltage,and therefore the output voltage from changing its sign.

The capacitor C2 serves when there is a counting current passing at standard frequency. It reduces the circulation of this current. The resistor $R_p$ serves to reduce the amplifier's attenuation when it is not fed, by reducing the impedance of the transformer on the line.It is necessary to reduce the impedance of the secondary and primary windings of the second transformer as the impedance of the primary winding of the first transformer is very low.

The diodes Rd3 and Rd4 also serves the purpose serves also to this end.

They realize a resistance in parallel with the output transformer.

In the embodiment of takes 5, a field effect transistor FET is connected in order to further reduce the attenuation of the amplifier A. This transistor,when normally fed, has a counter-polarization. When it is not fed it short-circuits the output terminals.

In the embodiment of FIG. 6, the balanced arrangement of the windings serves to avoid changes in the cross-talk damping between adjacent lines in the same cable. The capacitor $C_3$ allows the direct voltage for feeding to come from a remote source.

The Zener diode Z takes the voltage required for feeding from the remote source and the inductor L blocks the overcurrent pulses due to the external induction.

Figure 7:
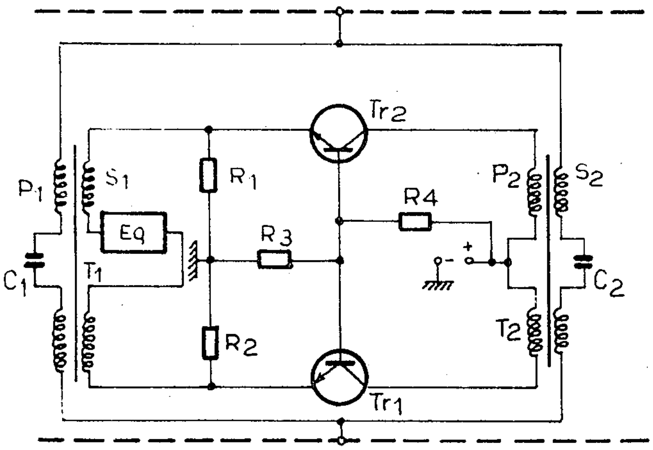
FIG. 7 shows a known repeater, of the parallel type.

The rectifier Rd5 prevents the supply current from casually changing its sign,and then prevents the amplifier from burning. The arrangement of the device according to the invention and adapted for connection in parallel on the line is shown in FIG. 7. The first transformer $P_1S_1$ has two windings each divided into two equal winding sections.

The same arrangement is repeated for the second transformer $P_2S_2$.

The capacitor $C_1$ is connected between the two sections of $P_1$ and the capacitor $C_2$ is connected between the two sections of $S_2$. The ends of the primary winding $P_1$ and of the secondary winding $S_2$ are connected to each other and in parallel with the line.

The equalization network Eq is connected between the two sections of $S_1$, whose ends are connected to the emitters of the two transistors Tr1 and Tr2.

The ends of the primary winding P2 are connected to the collectors of said transistors $Tr_1$ and $Tr_2$. The two sections of $P_2$ are connected directly to each other and to a terminal of the supply whose other terminal is grounded. The bases of the two transistors are connected together and their polarization is obtained by a choker formed by the resistors R4 and R3. One end of the resistor $R_4$ is connected to the supply, while the free end of $R_3$ is grounded.

The resistors $R_1$ and respectively $R_2$ are placed between the emitters and the ground.

Figure 8:
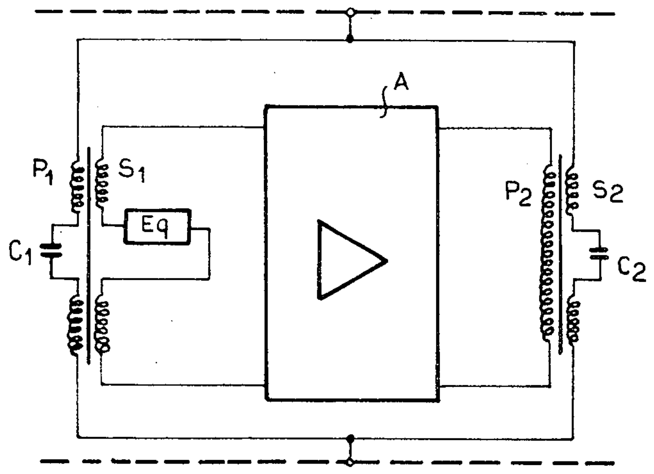
FIG. 8 is similar to FIG. 2, but relates to a parallel type amplifier, and shows a base diagram serving to disclose the innovating ideas of the invention.

In the embodiment of FIG. 8 the primary winding $P_1$ and the secondary winding $S_2$ are realized as in the preceding embodiment. The secondary winding $S_1$ is connected to the input of an amplifier A through the equalization network Eq,while the primary winding $P_2$ is connected to the output of said amplifier.

Figure 9:
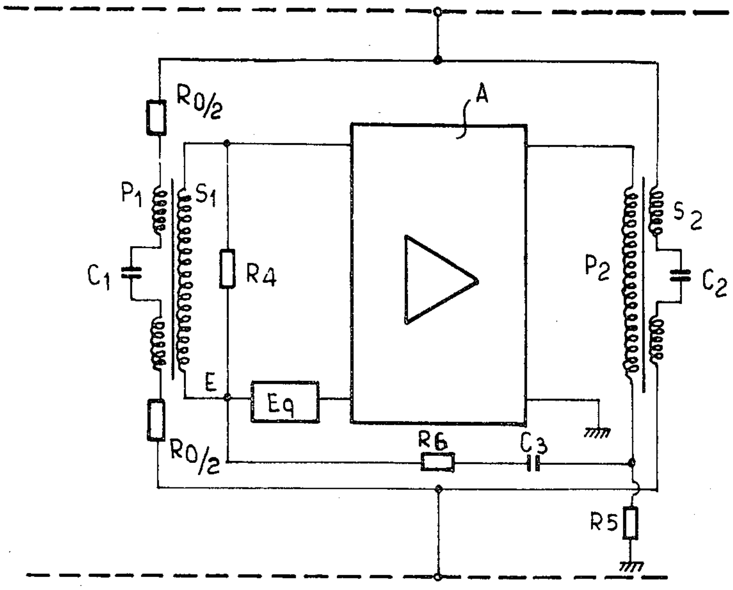
FIG. 9 is a first embodiment of an amplifier according to the invention, of the parallel type.

In the embodiment of FIG. 9, two equal resistors $R_o/2$ are placed on the primary winding of the first transformer. One end of the secondary winding $S_1$ is connected to one input terminal of the amplifier A and in parallel to the resistor $R_4$ end of said resistor is connected to the input terminal of the amplifier A and the other end is connected to the point E which is connected to the other input terminal of the amplifier through the equalization network $E_q$.

One output terminal of the amplifier is connected to one end of the transformer $T_2$ while the other is grounded.

The other end of the transformer $T_2$ is grounded by the resistor $R_5$.

A capacitor $C_3$ in series with the resistor $R_6$ is connected to the point E, the other end of $C_3$ is connected to the ungrounded end of $R_5$.

The connections of the secondary $S_2$ are as in the preceding embodiment.

Figure 10:
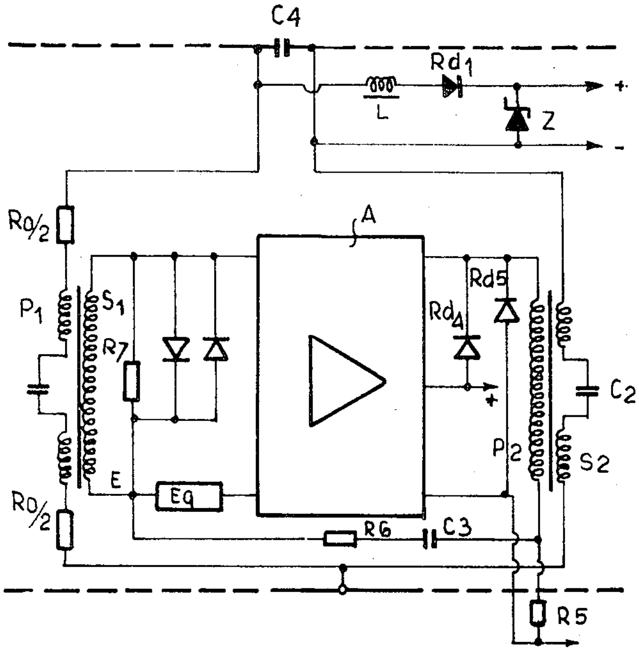
FIG. 10 is a diagram similar to the one in FIG. 9, but with more details.

Finally, FIG. 10 is similar to the preceding one, except that a capacitor $C_4$ is serially connected between the primary winding $P_1$ and the secondary winding $S_2$. The inductor L in series with the anode of a diode $Rd_1$ is connected to the ends of said capacitor $C_4$. The cathode of $Rd_1$ is connected to the cathode of the Zener diode Z, while the anode is connected to the capacitor $C_4$.

Furthermore the diodes $Rd_2$ and $Rd_3$ in antiparallel relationship are inserted in parallel with $S_1$. To the output terminal U of the amplifier A are connected two more diodes $Rd_4$, $Rd_5$ whose cathodes are connected to the point U, while their anodes are connected respectively to the positive pole and to the negative pole of the supply.

These diodes prevent harmful overvoltages from the line from appearing on the components of the amplifier.

They may be replaced, if necessary by varistors.

Obviously changes and modifications are possible in practice, without going out of the protection range of the invention.

What is claimed is:

1. A negative impedance amplifier for a transmission line, including an equalizing and gain regulating network, and comprising two transformers each having primary and secondary windings, and an amplifier unit containing a linear integrated circuit and a negative voltage feedback loop, wherein the primary winding of the first transformer is connected in series with the line and the secondary winding of the same transformer is connected to the input of the amplifier unit, the primary winding of the second transformer is connected to the output of the amplifier unit and the secondary winding of the second transformer is connected in series with the line and with the primary winding of the first transformer, and wherein said equalizing and gain regulating network is connected in the negative voltage feedback loop of the amplifier unit.

2. A negative impedance amplifier according to claim 1, further comprising a first rectifier placed between the output terminal of the amplifier unit and the ground, and a second rectifier placed between the output terminal of the amplifier unit and the input supplying the amplifier unit, the polarities of the rectifiers being selected so that they are normally in cut-off.

3. A negative impedance amplifier for a transmission line, including an equalizing and gain regulating network, and comprising two transformers each having primary and secondary windings, and an amplifier unit containing a linear integrated circuit and a negative current feedback loop, wherein the primary winding of the first transformer is connected in parallel with the line and the secondary winding of the same transformer is connected to the input terminals of the amplifier unit, the primary winding of the second transformer is connected between the output terminal of the amplifier unit and the ground, and the secondary winding of the second transformer is connected in parallel with the line, and wherein said equalizing and gain regulating network is connected in the negative current feed-back loop of the amplifier unit.

4. A negative impedance amplifier according to claim 3, further comprising a first rectifier connected between the output terminal of the amplifier unit and the ground, and a second rectifier connected between the output terminal of the amplifier unit and the input supplying the amplifier unit, the polarities of said rectifier being selected so that they are normally in cut-off.

* * * * *